US012597754B2

(12) United States Patent
Teng

(10) Patent No.: US 12,597,754 B2
(45) Date of Patent: Apr. 7, 2026

(54) PREDICTIVE CONTROL OF A PULSED LIGHT BEAM

(71) Applicant: Cymer, LLC, San Diego, CA (US)

(72) Inventor: Kuo-Tai Teng, Poway, CA (US)

(73) Assignee: Cymer, LLC, San Diego, CA (US)

( * ) Notice: Subject to any disclaimer, the term of this patent is extended or adjusted under 35 U.S.C. 154(b) by 832 days.

(21) Appl. No.: 17/797,791

(22) PCT Filed: Feb. 19, 2021

(86) PCT No.: PCT/US2021/018888
§ 371 (c)(1),
(2) Date: Aug. 5, 2022

(87) PCT Pub. No.: WO2021/194667
PCT Pub. Date: Sep. 30, 2021

(65) Prior Publication Data
US 2023/0055090 A1      Feb. 23, 2023

Related U.S. Application Data

(60) Provisional application No. 62/993,235, filed on Mar. 23, 2020.

(51) Int. Cl.
*H01S 3/00*          (2006.01)
*H01S 3/10*          (2006.01)
*H01S 3/225*          (2006.01)

(52) U.S. Cl.
CPC .......... *H01S 3/1003* (2013.01); *H01S 3/2251* (2013.01); *H01S 3/2256* (2013.01)

(58) Field of Classification Search
CPC ..... H01S 3/1003; H01S 3/2251; H01S 3/2256
See application file for complete search history.

(56) References Cited

U.S. PATENT DOCUMENTS 6,192,064 B1      2/2001   Algots et al.
8,520,186 B2      8/2013   Seong et al.
(Continued)

FOREIGN PATENT DOCUMENTS

CN          102484350 A      5/2012
CN          109845054 A      6/2019
(Continued)

OTHER PUBLICATIONS

Anna Cortona, European International Searching Authority, International Search Report and Written Opinion, counterpart PCT Application No. PCT/US2021/018888, mailed Jul. 26, 2021, 21 pages.

*Primary Examiner* — Mark Hellner
(74) *Attorney, Agent, or Firm* — DiBerardino McGovern IP Group LLC

(57) ABSTRACT

In some general aspects, a light beam control apparatus includes: a spectral feature actuator associated with a set of different states, each state configured to cause an optical apparatus to generate one or more pulses of a light beam at a discrete value of a spectral feature of the light beam; and a controller in communication with the spectral feature actuator. The controller includes: an actuator drive module configured to cause the spectral feature actuator to transition among the set of different states according to a control waveform; a waveform module configured to compute the control waveform for the spectral feature actuator that governs the transition among the set of discrete values; and a predictive module configured to receive one or more sensed aspects of the spectral feature actuator and instruct the waveform module to adjust the control waveform based on the received sensed aspects.

33 Claims, 11 Drawing Sheets

(56) References Cited

U.S. PATENT DOCUMENTS

| | | | | |
|---|---|---|---|---|
| 9,778,108 B2 * | 10/2017 | Thornes | .................... | G01J 3/26 |
| 9,835,959 B1 | 12/2017 | Conley et al. | | |
| 9,989,866 B2 * | 6/2018 | Mason | ................ | G03F 7/70041 |
| 9,997,888 B2 * | 6/2018 | Conley | .............. | G03F 7/70575 |
| 2002/0048288 A1 | 4/2002 | Kroyan et al. | | |
| 2002/0154669 A1 | 10/2002 | Spangler et al. | | |
| 2014/0104614 A1 * | 4/2014 | Rokitski | ................ | G01J 3/027 |
| | | | | 356/402 |
| 2015/0355025 A1 * | 12/2015 | Duffey | ............... | G03F 7/70041 |
| | | | | 355/67 |
| 2018/0107017 A1 | 4/2018 | Mason | | |
| 2018/0109068 A1 | 4/2018 | Conley et al. | | |
| 2018/0203248 A1 | 7/2018 | op 't Root et al. | | |
| 2018/0254600 A1 | 9/2018 | Kumazaki et al. | | |
| 2019/0324286 A1 | 10/2019 | op 't Root et al. | | |
| 2021/0011302 A1 | 1/2021 | Mason | | |
| 2021/0018846 A1 | 1/2021 | O'Brien et al. | | |
| 2021/0367396 A1 | 11/2021 | Miyamoto et al. | | |

FOREIGN PATENT DOCUMENTS

| | | | |
|---|---|---|---|
| JP | 2019532335 A | 11/2019 | |
| JP | 2019537833 A | 12/2019 | |
| JP | 2020507099 A | 3/2020 | |
| JP | 2021517353 A | 7/2021 | |
| TW | 202004353 A | 1/2020 | |
| WO | 2004012308 A2 | 2/2004 | |
| WO | 2017098625 A1 | 6/2017 | |
| WO | 2018175454 A1 | 9/2018 | |
| WO | 2019190700 A1 | 10/2019 | |
| WO | 2020183644 A1 | 9/2020 | |
| WO | 2020231946 A1 | 11/2020 | |

* cited by examiner

PREDICTIVE CONTROL OF A PULSED LIGHT BEAM

CROSS REFERENCE TO RELATED APPLICATIONS

This application claims priority to U.S. Application No. 62/993,235, filed Mar. 23, 2020 and titled PREDICTIVE CONTROL OF A PULSED LIGHT BEAM, and which is incorporated herein in its entirety by reference.

TECHNICAL FIELD

The disclosed subject matter relates to controlling a spectral feature, such as, for example, bandwidth or wavelength, of a light beam output from an optical apparatus that supplies light to a lithography exposure apparatus.

BACKGROUND

In semiconductor lithography (or photolithography), the fabrication of an integrated circuit (IC) requires a variety of physical and chemical processes performed on a semiconductor (for example, silicon) substrate (which is also referred to as a wafer). A lithography exposure apparatus (which is also referred to as a scanner) is a machine that applies a desired pattern onto a target region of the substrate. A patterning device, which is alternatively referred to as a mask or a reticle, can be used to generate the desired pattern to be formed. Transfer of the pattern is typically accomplished by imaging onto a layer of radiation-sensitive material (resist) provided on the substrate.

The substrate is irradiated by a light beam, which has a wavelength in the ultraviolet range, somewhere between visible light and x-rays, and thus has a wavelength between about 10 nanometers (nm) to about 400 nm. Thus, the light beam can have a wavelength in the deep ultraviolet (DUV) range, for example, with a wavelength that can fall from about 100 nm to about 400 nm or a wavelength in the extreme ultraviolet (EUV) range, with a wavelength between about 10 nm and about 100 nm. These wavelength ranges are not exact, and there can be overlap between whether light is considered as being DUV or EUV. For example, DUV excimer lasers are commonly used to produce the light beam. Examples of DUV excimer lasers include the krypton fluoride (KrF) laser at a 248 nm wavelength and the argon fluoride (ArF) laser at a 193 nm wavelength.

The light beam is passed through a beam delivery unit, filtered through the mask, and then projected onto the prepared substrate. The relative position between the substrate and the light beam is moved in an image plane and the process is repeated at each target region of the substrate. In this way, a chip design is patterned onto a photoresist that is then etched and cleaned, and then the process repeats.

SUMMARY

In some general aspects, a light beam control apparatus includes: a spectral feature actuator associated with a set of different states, each state configured to cause an optical apparatus to generate one or more pulses of a light beam at a discrete value of a spectral feature of the light beam; and a controller in communication with the spectral feature actuator. The controller includes: an actuator drive module configured to cause the spectral feature actuator to transition among the set of different states according to a control waveform; a waveform module configured to compute the control waveform for the spectral feature actuator that governs the transition among the set of discrete values; and a predictive module configured to receive one or more sensed aspects of the spectral feature actuator and instruct the waveform module to adjust the control waveform based on the received sensed aspects.

Implementations can include one or more of the following features. For example, the light beam control apparatus can further include an actuator sensor configured to sense one or more aspects of the spectral feature actuator. The predictive module can be in communication with the actuator sensor to receive the sensed aspects of the spectral feature actuator.

The controller can drive the spectral feature actuator among the set of different states at a frequency correlated with a pulse repetition rate requested by a lithography exposure apparatus receiving the light beam for patterning a substrate. The controller can drive the spectral feature actuator among the set of different states at a frequency that is greater than a pulse repetition rate, the pulse repetition rate corresponding to a rate at which the one or more pulses of the light beam are generated.

The controller can include a lithography module in communication with a lithography exposure apparatus and configured to receive a pulse repetition rate from the lithography exposure apparatus. The control waveform can be based on the pulse repetition rate received from the lithography exposure apparatus.

Each time a pulse is generated, the spectral feature actuator can be in one of the different states and the light beam pulse can have a spectral feature that corresponds to that different state.

The light beam control apparatus can also include a measurement apparatus configured to sense a spectral feature of the light beam. The controller can include a spectral feature module configured to receive the sensed spectral feature of the light beam, to analyze the sensed spectral feature, and to instruct the waveform module to adjust the control waveform based on the analysis. The spectral feature module can be configured to analyze the sensed spectral feature using one or more of: proportional-integral-derivative control, Model Predictive Control, and state feedback with Kalman filter. The spectral feature module can be configured to analyze the sensed spectral feature by converting the sensed spectral feature to an estimated state of the spectral feature actuator and then comparing this estimated state of the spectral feature actuator to the output of the control waveform.

The spectral feature actuator can be in communication with at least one optical element of a spectral feature adjuster of the optical apparatus, the at least one optical element optically interacting with the light beam. Each different state of the spectral feature actuator can correspond to a discrete state of the optical element. A discrete state of the optical element can be a discrete location at which the optical element optically interacts with the light beam. The optical element can include a prism through which the light beam passes. The spectral feature actuator can include at least a motor physically coupled to the prism, the operation of the motor causing the prism to rotate.

The spectral feature adjuster can include: a dispersive optical element arranged to interact with the light beam; and a plurality of prisms arranged in the path of the light beam between the dispersive optical element and an output of the optical apparatus. The optical element in communication with the spectral feature actuator can be at least one of the prisms or the dispersive optical element.

The spectral feature adjuster can optically interact with a seed pulsed light beam generated by a first gas discharge stage of the optical apparatus.

The spectral feature of the light beam can be a wavelength or a bandwidth of the light beam.

The control waveform can include a periodic driving signal. The waveform module can be configured to adjust the control waveform by adjusting one or more of a frequency and/or a phase of the control waveform. The waveform module can be configured to compute the control waveform based on: a pulse repetition rate determined from triggers output from a lithography exposure apparatus receiving the light beam; a target separation between the discrete values of the spectral feature of the light beam; and a sensitivity metric indicating how much the value of the spectral feature of the light beam changes in response to a change in the spectral feature actuator.

The predictive module can be configured to analyze the received sensed aspects of the spectral feature actuator to determine the instructions to the waveform module to adjust the control waveform. The analysis of the received sensed aspects of the spectral feature actuator can include one or more of proportional-integral-derivative control, model predictive control, and state feedback with a Kalman filter. The waveform module can adjust the control waveform by modifying a trajectory of the control waveform in real-time. The predictive module can be configured to receive and analyze the sensed aspects of the spectral feature actuator at a rate that is at least twice, at least three times, or at least five times the frequency of the control waveform.

The control waveform can cause the spectral feature actuator to cycle among the discrete values in accordance with a state frequency. The predictive module can be configured to instruct the adjustment to the waveform module at an update frequency that is greater than the state frequency.

In other general aspects, a method includes: producing pulses of a light beam; while producing the pulses, driving a spectral feature actuator among a set of different states in accordance with a control waveform, with each different state corresponding to a discrete value of the spectral feature of the light beam such that, each time a pulse is generated, the spectral feature actuator is in one of the different states and the light beam pulse has a spectral feature that corresponds to that different state; and, in between the production of pulses, adjusting the control waveform based on one or more sensed aspects of the spectral feature actuator.

Implementations can include one or more of the following features. For example, the method can further include sensing the one or more aspects of the spectral feature actuator. The method can also include receiving a pulse repetition rate from a lithography exposure apparatus that is positioned to receive the produced light beam pulses. The control waveform can include a periodic structure correlated with the pulse repetition rate. The method can also include receiving a sensed spectral feature of the light beam and adjusting the control waveform based on the received sensed spectral feature.

The spectral feature of the light beam can be a wavelength or a bandwidth of the light beam.

The control waveform can include a periodic driving signal.

The control waveform can be adjusted by adjusting one or more of a frequency, an amplitude, and a phase of the control waveform. The control waveform can be adjusted by modifying a trajectory of the control waveform in real-time.

The method can also include computing the control waveform based on one or more of: a pulse repetition rate determined from triggers output from a lithography exposure apparatus receiving the light beam; a target separation between the discrete values of the spectral feature of the light beam; and a sensitivity metric indicating how much the value of the spectral feature of the light beam changes in response to a change in the spectral feature actuator.

The method can also include analyzing the one or more sensed aspects of the spectral feature actuator including performing one or more of proportional-integral-derivative control, model predictive control, and state feedback with a Kalman filter.

DESCRIPTION

Figures 1, 2:
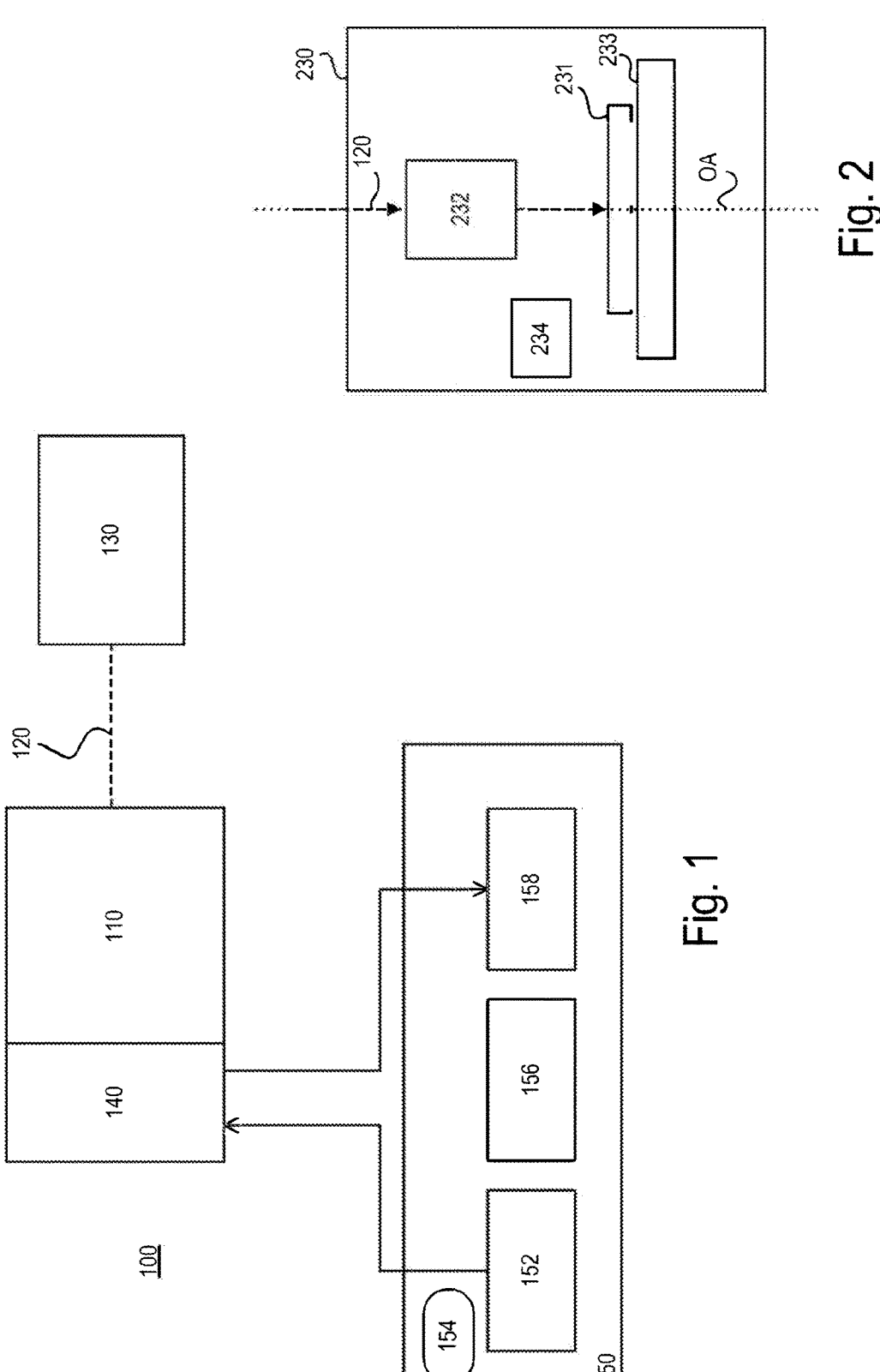
FIG. 1 is a block diagram of a predictive control apparatus including an optical apparatus that generates pulses of a light beam for use by a device, a spectral feature actuator interacting with the optical apparatus, and a controller in communication with the spectral feature actuator.
FIG. 2 is a block diagram of an implementation of the device of FIG. 1 in which the device is a photolithography exposure apparatus that receives the light beam generated by the optical apparatus.

Referring to FIG. 1, a predictive control apparatus 100 is shown. The predictive control apparatus 100 includes an optical apparatus 110 that generates pulses of a light beam 120 directed to a device 130. Sometimes, it is desired to change a spectral feature (such as a wavelength) of the light beam 120 as it is directed toward the device 130. The device 130 may require that the wavelength of the light beam 120 be changed between a set of distinct or different wavelengths with each pulse or every set number of pulses. Pulses of the light beam 120 can be produced in clusters or sets of pulses interspersed by times when no pulses are being produced. Such clusters or sets of pulses are referred to as bursts. The clustering of the pulses into bursts and the number of pulses in a burst can be governed by the requirements of the device 130.

With reference to FIG. 2, in some implementations, the device 130 is a photolithography exposure apparatus 230 configured for applying a desired pattern onto a target region of a substrate 231. The photolithography exposure apparatus 230 includes an optical arrangement 232 in the path of the incoming light beam 120, the optical arrangement 232 including, for example, one or more condenser lenses, a mask, and an objective arrangement. The mask is movable along one or more directions, such as along an optical axis OA of the light beam 120, or in a plane that is perpendicular to the optical axis OA of the light beam 120. The objective arrangement 232 includes a projection lens and enables the image transfer to occur from the mask to the photoresist on the substrate 231.

The photolithography exposure apparatus 230 might require a control of the light beam 120 that enables multi-focal imaging at the substrate 231 being patterned. The photolithography apparatus may need the wavelength of the light beam 120 to change in a regular and periodic fashion when forming three-dimensional (3D) or vertical NAND tiers of memory (that is, memory in which the structure resembles NAND gates stacked on top of each other) on the substrate 231. Creating complex 3D structures on a substrate is complicated and requires extreme precision and, ultimately, process uniformity and repeatability to achieve scale. Moreover, as multi-layered stack heights increase, so does the difficulty in achieving consistent etch and deposition results at the top and the bottom of the stack, for example, a memory array.

The formation of 3D NAND memory requires a varying depth of focus at the substrate 231. Lithography depth of focus (DOF) is determined by the relationship $DOF=\pm m\lambda/(NA)^2$ where $\lambda$ is the wavelength of the illuminating light (the light beam 120), NA is a numerical aperture of the projection lens (within the photolithography exposure apparatus 230) as seen by the substrate 231, and m is a practical factor depending on the resist process. Thus, in order to obtain the varying depth of focus, more than one exposure pass is made over the substrate 231 using a different laser wavelength for each pass. Alternately, the wavelength of light beam can be varied every few pulses, or on a pulse-to-pulse basis (that is, with each pulse), to enable more control over depth of focus in a single pass. In addition, the materials making up the lenses within the optical arrangement 232 of the photolithography exposure apparatus 230 are dispersive, and thus different wavelengths come to focus at different depths within the substrate 231. This is another reason why it may be desirable to have the ability to change the wavelength of the light beam 120.

Figures 3A, 3B, 4, 5:
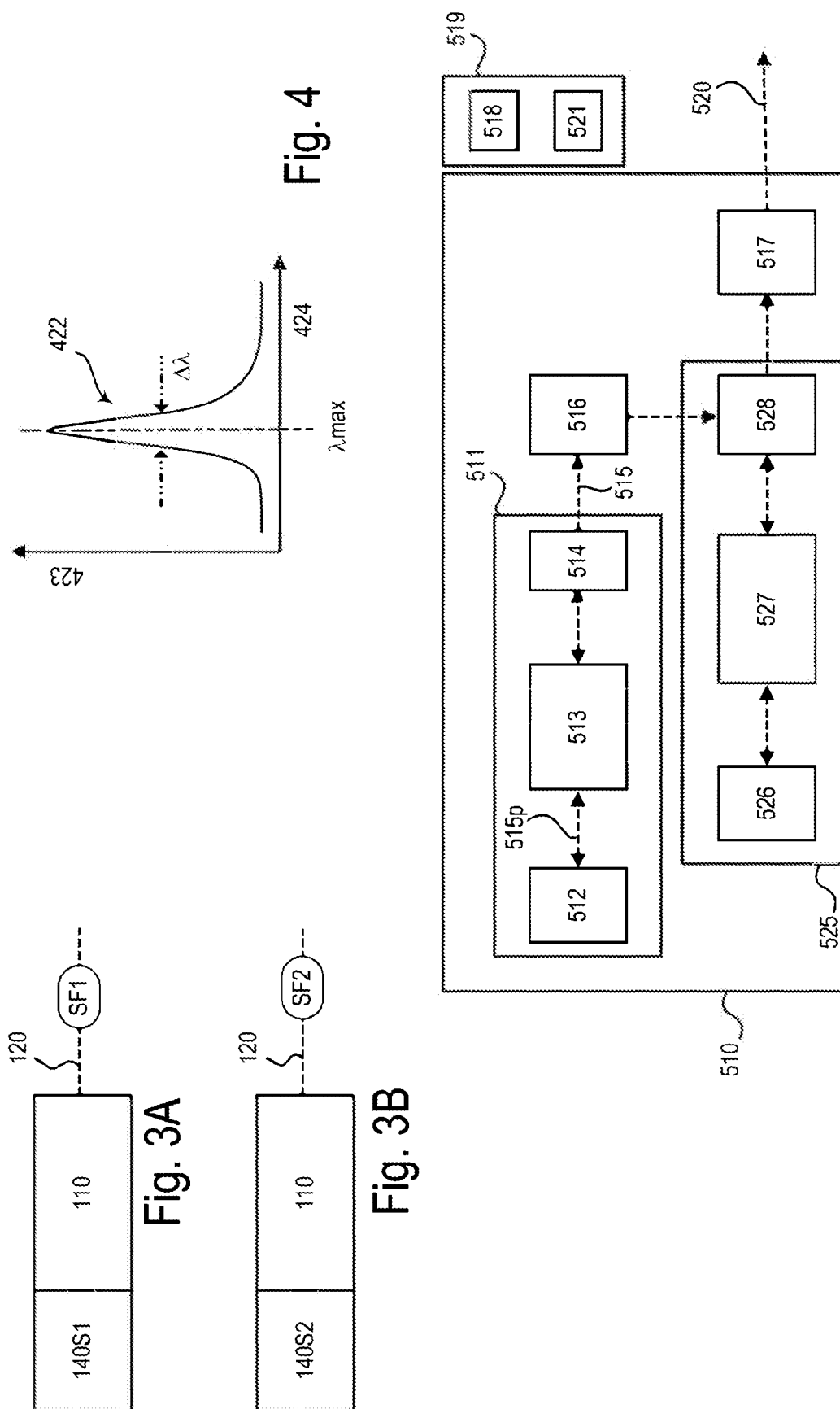
FIGS. 3A and 3B are block diagrams showing, respectively, a first state of the spectral feature actuator and a second state of the spectral feature actuator of FIG. 1.
FIG. 4 is a diagram of an exemplary optical spectrum of the light beam of FIG. 1.
FIG. 5 is a block diagram of an implementation of the optical apparatus of FIG. 1, in which the optical apparatus is a dual-stage pulsed light source.

To this end, the predictive control apparatus 100 includes a spectral feature actuator 140 and a controller 150 in communication with the spectral feature actuator 140. The spectral feature actuator 140 is associated with a set of different states, with each state configured to cause the optical apparatus 110 to generate one or more pulses of the light beam 120 at a discrete value of a spectral feature of the light beam 120. For example, as shown in FIG. 3A, the spectral feature actuator 140 is in a first state 140S1 in which pulses of the light beam 120 are emitted, such pulses having a first spectral feature SF1, and as shown in FIG. 3B, the spectral feature actuator is in a second state 140S2 in which pulses of the light beam 120 are emitted, such pulses having a second spectral feature SF2 that is different from the first spectral feature SF1.

The controller 150 includes an actuator drive module 152 configured to cause the spectral feature actuator 140 to transition among the set of different states (140Si) according to a control waveform 154. The actuator drive module 152 can be implemented as a field programmable gate array. The controller 150 also includes a waveform module 156 configured to compute or calculate the control waveform 154 for the spectral feature actuator 140 that governs the transition among the set of different states 140Si.

Even though the spectral feature actuator 140 transitions among the set of different states 140Si in accordance with the control waveform 154, it is possible that the spectral feature actuator 140 is not in the correct state 140Si when the pulse of the light beam 120 is generated and thus the pulse of the light beam 120 may not be at the discrete value of the spectral feature SFi that is desired by the device 130. Instead, the pulse of the light beam 120 could have an actual spectral feature value that is offset by an amount from the desired value SFi. Accordingly, the predictive control apparatus 100 provides for predictive correction to the light beam 120 prior to the light beam 120 being output from the optical apparatus 110. The predictive control apparatus 100 uses predictive correction to adjust the control waveform 154 in real time to account for errors in the control waveform 154, disturbances or changes in the spectral feature actuator 140, and/or disturbances or changes in the optical apparatus 110 during operation. Moreover, such predictive correction does not require that the controller 150 wait to determine information about the light beam 120 (which can only be determined after the light beam 120 is produced), although the controller 150 can additionally use feedback relating to the light beam 120 along with the predictive correction, as discussed in detail below. The predictive control apparatus 100 is thereby able to improve the control of the wavelength of the light beam 120 when multi-focal imaging is required by the device 130.

The predictive correction is affected by the controller 150, which receives information relating to the state or attributes of the spectral feature actuator 140. To this end, the controller 150 further includes a predictive module 158 configured to receive one or more sensed aspects of the spectral feature actuator 140. The predictive module 158 analyzes these sensed aspects, and instructs the waveform module 156 to adjust the control waveform 154 based on the analysis.

Referring again to FIG. 2, an implementation 230 of the photolithography exposure apparatus includes a table or mount 233 onto which the substrate 231 is placed, the table 233 being connected to a positioner to accurately position the substrate 231 in accordance with certain parameters. The photolithography exposure apparatus 230 can also include a lithography controller 234, air conditioning devices, and power supplies for the various electrical components. The lithography controller 234 controls how the layers are printed on the substrate 231, and can also control the positioning of the table 233. The lithography controller 234 includes memory that stores information such as process recipes. A process recipe determines a length of exposure on the substrate 231 based on, for example, the mask used, as well as other factors that impact the exposure. During lithography, a plurality of pulses of the light beam 12 illuminates the same area of the substrate 231 to constitute an illumination dose.

Referring to FIG. 4, spectral feature of the light beam 120 can include any aspect of representation associated with the optical spectrum 422 of the light beam 120. The optical spectrum 422 is depicted in the form of a diagram where the spectral intensity 423 (not necessarily with an absolute calibration) is plotted as a function of the wavelength or optical frequency 424. The optical spectrum 422 can be referred to as the spectral shape or intensity spectrum of the light beam 120. Thus, wavelength is a spectral feature and the wavelength can be the value λ max of the optical spectrum 422 at the greatest intensity. As another example, bandwidth, which is a measure of a width Δλ of the optical spectrum 422, is a spectral feature. The bandwidth can be the actual, instantaneous bandwidth of the optical spectrum 422.

Generally, for use by the photolithography exposure apparatus 230, the light beam 120 has a wavelength in the deep ultraviolet (DUV) range, for example, with a wavelength of about 248 nanometers (nm) or about 193 nm. The minimum size of the microelectronic features that can be patterned on the substrate 231 (FIG. 2) depends on the wavelength of the light beam 120, with a lower wavelength permitting a smaller minimum feature size. For example, if the wavelength of the light beam 120 is 248 nm or 193 nm, the minimum size of the microelectronic features can be 50 nm or less.

Referring again to FIG. 1, the controller 150 includes one or more of digital electronic circuitry, computer hardware, firmware, and software. Each of the modules 152, 156, 158 can be implemented in such digital electronic circuitry, hardware, firmware, or software. The controller 150 also includes memory that can read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. The controller 150 can further include one or more input devices (such as a keyboard, touch screen, microphone, mouse, hand-held input device, etc.) and one or more output devices (such as a speaker or a monitor). The controller 150 also includes one or more programmable processors, and one or more computer program products tangibly embodied in a machine readable storage device for execution by one or more programmable processors. The controller 150 can be centralized (in which all components are located in proximity of each other), or, various components of the controller 150 can be partially or wholly distributed throughout the predictive control apparatus 100.

Referring to FIG. 5, in some implementations, the optical apparatus 110 is a dual-stage pulsed light source 510 that produces a pulsed light beam 520 as the light beam 120. The light source 510 is a gas discharge light source that includes a seed light stage 511 producing a seed light beam 515, an amplification stage 525 that amplifies the power of the seed light beam 515 to produce as the light beam 120 an output light beam 520, a relay optical system 516, and an output system 517.

The seed light stage 511 includes, for example, a master oscillator (MO) chamber 513 housing a gain medium), an optical output coupler 514, and a beam turning arrangement 512. A window can be provided on the MO chamber 513 permitting a portion of the seed light beam (called a precursor light beam 515*p*) to pass to the beam turning arrangement 512. The beam turning arrangement 512 and the output coupler 514 forming an oscillator cavity in which the seed light stage 511 forms the seed light beam 515. The beam turning arrangement 512 can be designed as a spectral feature adjuster, in which one or more spectral features of the seed light beam 515 (and thus the output light beam 520) can be adjusted, as discussed in greater detail below. The optical output coupler 514 can include a partially reflective mirror.

The relay optical system 516 can include one or more optical elements configured to redirect the seed light beam 515 toward the amplification stage 525. The relay optical system 516 can also include optical elements configured to modify aspects (such as a transverse extent or a wavefront) of the seed light beam 515.

The amplification stage 525 can be designed, for example, as a power ring amplifier that includes a power amplifier (PA) chamber 527 (housing a gain medium), a beam reverser 526, and an optical coupling system 528. The optical coupling system 528 can include a partially reflective optical element that acts to both couple the seed light beam 515 into the amplification stage 525 (from the seed light stage 511) and couple light out of the amplification stage 525 (toward the output system 517) as the output light beam 520. The optical coupling system can further include one or more mirrors and prisms configured to operate at the nominal operating spectral features (for example, at wavelengths in the DUV range).

The MO chamber 513 and the PA chamber 527 are configured as chambers in which electrical discharges between electrodes can cause gas discharges in a gain medium to create an inserted population of high energy molecules, including, for example, argon, krypton, and xenon.

The output system 517 can include one or more subsystems for adjusting aspects of the output light beam 520. For example, the output system 517 can include an optical pulse stretcher or metrology for measuring an energy of the output light beam 520.

Moreover, the predictive control apparatus 100 can also include a measurement system 519 including one or more measurement devices that are arranged at various locations within the light source 510. For example, the measurement system 519 can include one or more spectral feature analysis devices 518, 521, each configured to measure or sense a spectral feature related to a light beam within produced within (such as the seed light beam 515) or output from (such as the light beam 520) the optical apparatus 510. One device 518 is a bandwidth analysis module positioned within or at the output of the optical apparatus 510. The bandwidth analysis module 518 is configured to measure a bandwidth of the light beam 520. Another device 521 is a wavelength analysis module positioned within or at the output of the optical apparatus 510. In some implementations, the wavelength analysis module 521 is placed at the output of the seed light stage 511. The wavelength analysis module 521 can include, for example, an etalon spectrometer that provides a fine wavelength measurement, and a grating spectrometer that provides a coarse wavelength measurement.

Figure 6:
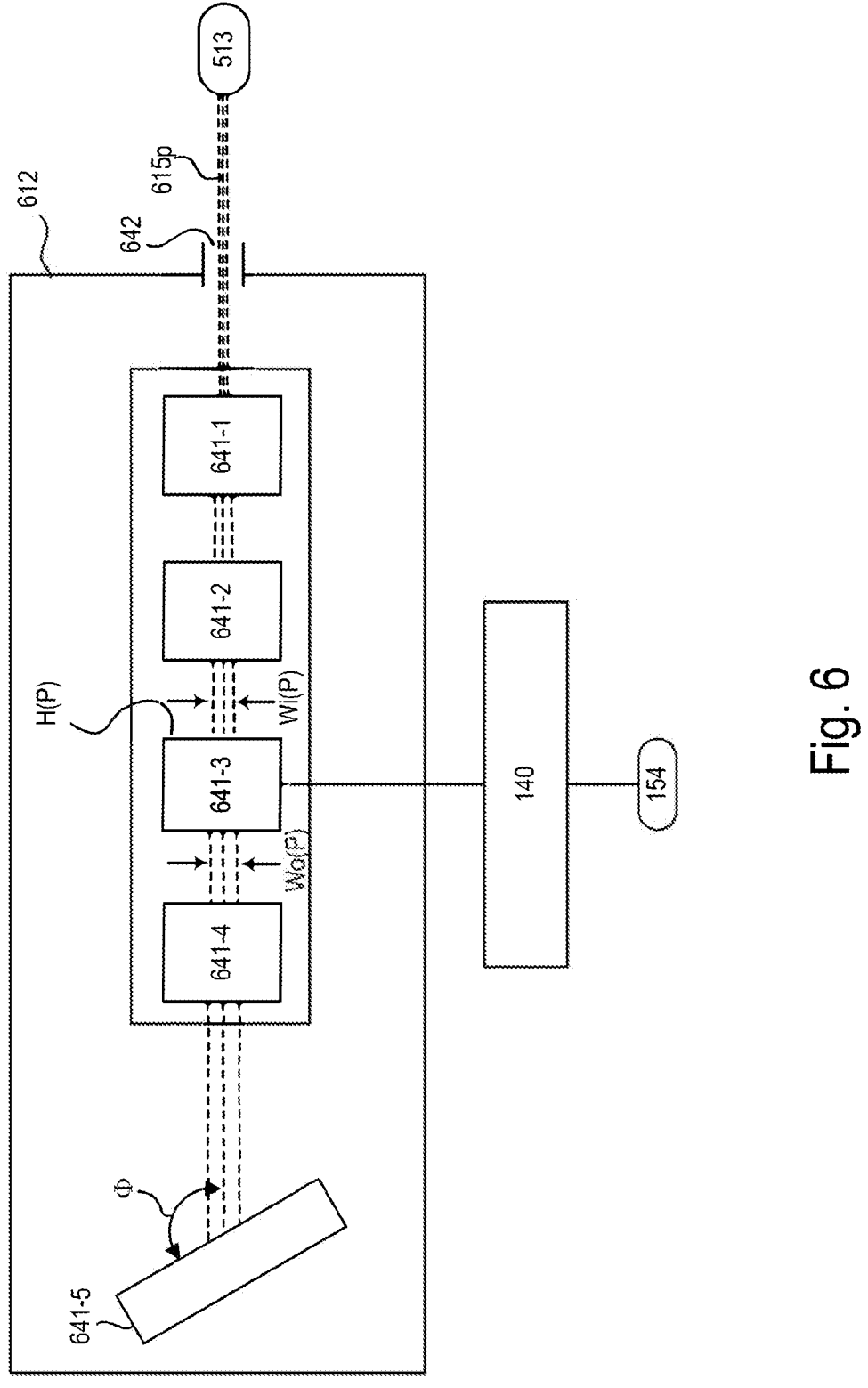
FIG. 6 is a block diagram of an implementation of a spectral feature adjuster of the dual-stage pulsed light source of FIG. 5, the spectral feature adjuster being in communication with the spectral feature actuator of FIG. 1.

As mentioned above, the beam turning arrangement 512 can be designed as a spectral feature adjuster, in which one or more spectral features of the seed light beam 515 (and thus the output light beam 520) are adjusted. Specifically, tuning of the spectral features of the output light beam 520 is affected by the tuning applied to the seed light beam 515 by the spectral feature adjuster 512. With reference to FIG. 6, in some implementations, the spectral feature adjuster 512 is an optical arrangement 612 including a plurality of optical components or features, each interacting with a precursor light beam 615p from the MO chamber 513. For example, the plurality of optical components includes optical features or components 641-1, 641-2, 641-3, 641-4, and 641-5 arranged to optically interact with the precursor light beam 615p. The optical components of the optical arrangement 612 are each made of a material that is suitable for interacting with the precursor light beam 615p having a wavelength in the DUV range.

In some implementations, the optical component 641-5 is a dispersive optical element such as a grating. Moreover, the optical components 641-1, 641-2, 641-3, 641-4 are refractive optical elements such as prisms, that, together, act as a beam expander/beam compressor. The grating 641-5 can be a reflective grating that is designed to disperse and reflect the light beam 615p. And, each of the prisms 641-1, 641-2, 641-3, 641-4 is a transmissive prism that acts to disperse and redirect the light beam 615p as it passes through the body of the prism. Each of the prisms can be made of a material (such as, for example, calcium fluoride) that permits the transmission of the wavelength of the light beam 615p.

The light beam 615p enters the optical arrangement 612 through an aperture 642, and then travels through the prism 641-1, the prism 641-2, the prism 641-3, and the prism 641-4, in that order, prior to impinging upon a diffractive surface of the grating 641-5. With each passing of the light beam 615p through a consecutive prism 641-1, 641-2, 641-3, 641-4, the light beam 615p is optically magnified and redirected (refracted at an angle) toward the next optical component. The light beam 615p is diffracted and reflected from the grating 641-5 back through the prism 641-4, the prism 641-3, the prism 641-2, and the prism 641-1, in that order, prior to passing through the aperture 642 as the light beam 615p exits the optical arrangement 612 back toward the MO chamber 513. With each passing through the consecutive prisms 641-4, 641-3, 641-2, 641-1 from the grating 641-5, the light beam 615p is optically compressed as it travels toward the aperture 642.

The rotation of any one prism P (where P is any of 641-1, 641-2, 641-3, or 641-4) in the optical arrangement 612 changes an angle of incidence at which the light beam 615p impinges upon the entrance surface H(P) of that rotated prism P. Moreover, two local optical qualities, namely, an optical magnification OM(P) and a beam refraction angle δ(P) of the light beam 615p through that rotated prism P, are functions of the angle of incidence of the light beam 615p impinging upon the entrance surface H(P) of that rotated prism P. The optical magnification OM(P) of the light beam 615p through the prism P is the ratio of a transverse width Wo(P) of the light beam 615p exiting that prism P to a transverse width Wi(P) of the light beam 615p entering that prism P. A change in the local optical magnification OM(P) of the light beam 110A at one or more of the prisms P causes an overall change in the optical magnification OM of the light beam 615p. Additionally, a change in the local beam refraction angle δ(P) through one or more of the prisms P causes an overall change in an angle of incidence Φ of the light beam 615p at the surface of the grating 641-5. The wavelength of the light beam 615p can be adjusted by changing the angle of incidence Φ at which the light beam 615p impinges upon the diffractive surface of the grating

641-5. The bandwidth of the light beam 615p can be adjusted by changing the optical magnification OM of the light beam 615p.

Figure 7:
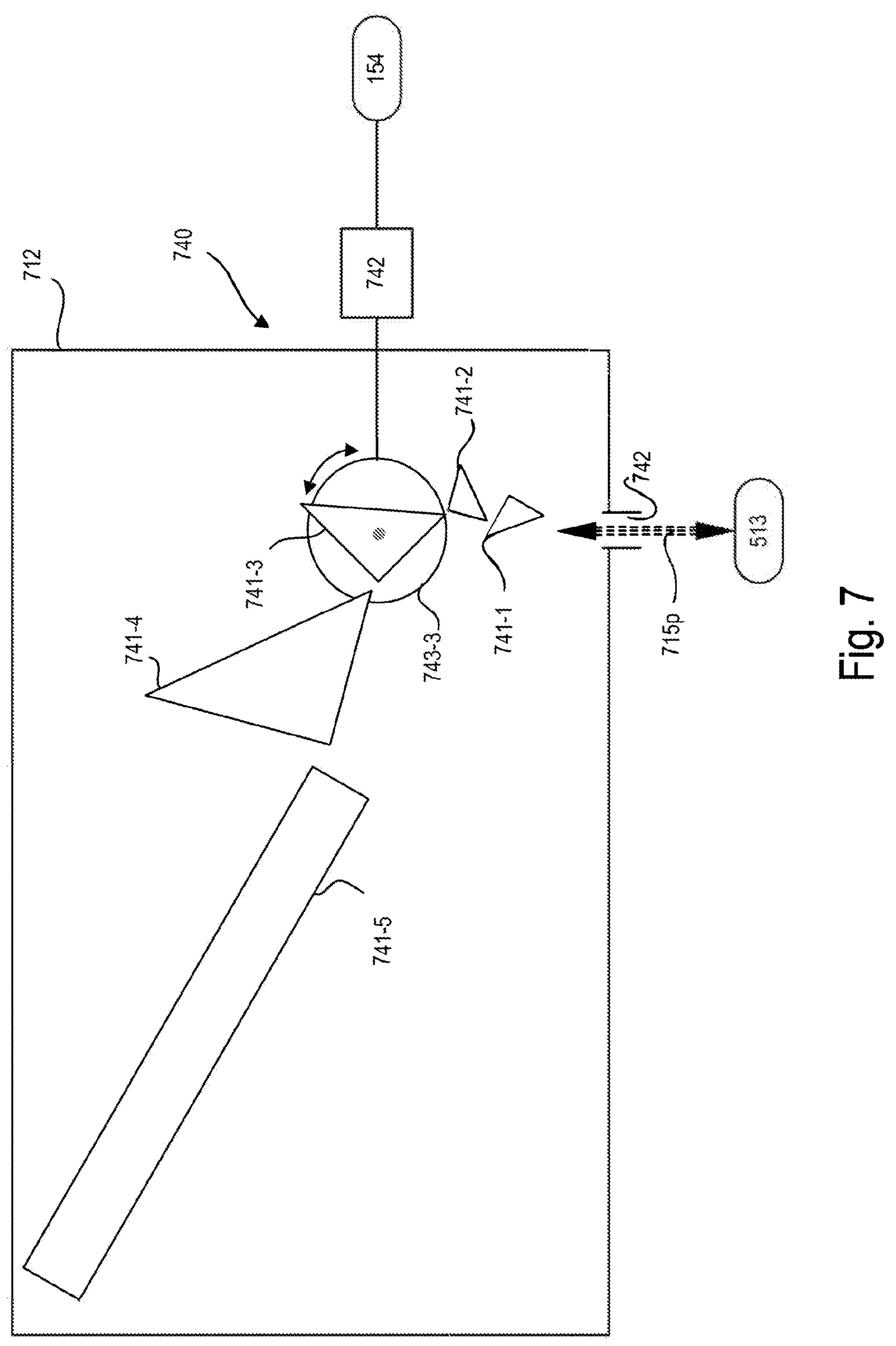
FIG. 7 is a plan view of an implementation of the spectral feature adjuster of FIG. 6.

Referring to FIG. 7, in some implementations, the spectral feature actuator 140 is a spectral feature actuator 740 associated with a spectral feature adjuster 712 of the optical apparatus 110. The spectral feature adjuster 712 is designed so that prisms 741-1, 741-2, 741-3, 741-4 and the grating 741-5 are arranged in a Littrow configuration in which the grating 741-5 is used such that the angle of incidence Φ of the light beam 715p onto the grating 741-5 is equal to the angle of exit of the light beam 715p from the grating 741-5. In this example, the grating 741-5 can be a high blaze angle Echelle grating, and the light beam 715p incident on the grating 741-5 at any angle of incidence (13 that satisfies a grating equation will be reflected (diffracted). The wavelength of the light beam 715p can be tuned over the entire gain bandwidth of the resonators within the optical apparatus 510 by varying the angle of incidence Φ of the light beam 715p onto the grating 741-5.

The spectral feature actuator 740 includes a control module 742 that includes electronics in the form of any combination of firmware and software. The control module 742 is connected to at least one actuation system 743-3 physically coupled to the prism 741-3 and is configured to receive the control waveform 154 from the actuator drive module 152 of the controller 150. While not shown in FIG. 7, the spectral feature actuator 740 can include other actuation systems physically coupled to other prisms, such as an actuation system physically coupled to the prism 741-4 and an actuation system physically coupled to the prism 741-1, such actuation systems being controlled by the control module 742. Moreover, it is additionally or alternatively possible that one or more of the prisms and the grating within the spectral feature adjuster 712 are either kept stationary or are not physically coupled to an actuation system. For example, in some implementations, the grating 741-5 can be kept stationary and the prism 741-2 can be kept stationary and not physically coupled to an actuation system.

The actuation system 743-3 is a mechanical device for moving or controlling the prism 741-3. The actuation system 743-3 receives energy from the control module 742, and converts that energy into some kind of motion imparted to the prism 741-3. For example, the actuation system 743-3 can be any one of a force device and rotation stage for rotating the prism 741-3. The actuation system 743-3 can include, for example, a motor such as a stepper motor, a valve, a pressure-controlled device, a piezoelectric device, a linear motor, a hydraulic actuator, or a voice coil.

Figure 8A:
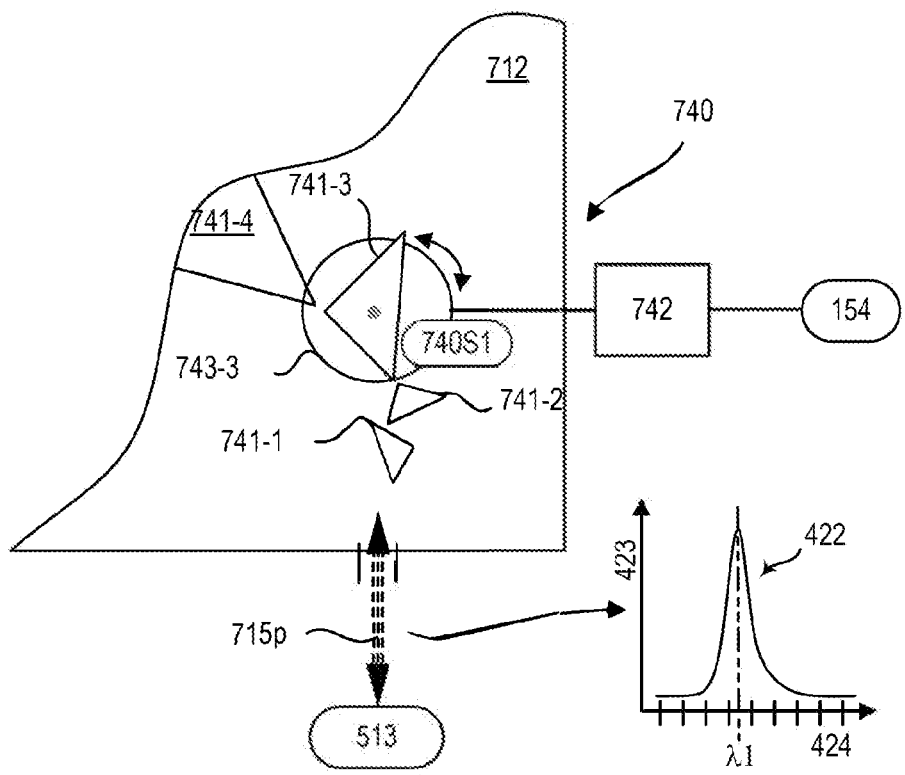
FIGS. 8A and 8B are plan views showing, respectively, first and second states of a spectral feature actuator and corresponding first and second states of an associated prism within the spectral feature adjuster of FIG. 7.
Figure 8B:
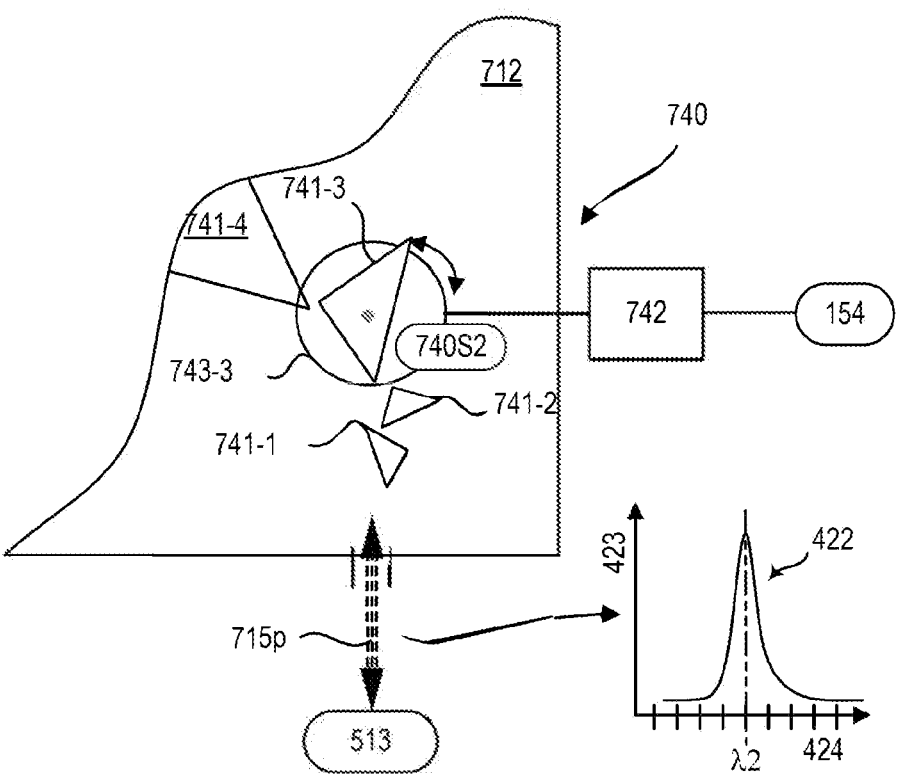

In some implementations, the actuation system 743-3 includes a linear motor (for example, including a piezoelectric transducer) physically coupled to a mechanical flexure that is attached to a mount on which the prism 741-3 is fixed. The linear motor converts the signal from the control module 742 into a linear translation applied to the mechanical flexure, which causes a rotational movement of the prism 741-3. In other implementations, the actuation system 743-3 includes a rotary motor physically coupled to the prism 741-3, and a piezoelectric motor driving the rotary motor to thereby rotate the prism 741-3. The rotation of the prism 741-3 changes the angle of incidence Φ (see FIG. 6) of the light beam 715p at the surface of the grating 741-5 to thereby modify the wavelength of the light beam 715p (and therefore the wavelength of the light beam 520 output from the optical apparatus 510). Thus, and with additional reference to FIGS. 8A and 8B, in this implementation, the spectral feature actuator 740 is in a first state in which pulses of the light beam $715p$ (and also the output light beam $520$) are emitted with a first wavelength $\lambda 1$ whenever the prism $741\text{-}3$ is in a first rotational state $740S1$, while the spectral feature actuator $740$ is in a second state in which the pulses of the light beam $715p$ (and also the output light beam $520$) are emitted with a second wavelength $\lambda 2$ whenever the prism $741\text{-}3$ is in a second rotational state $740S2$. More than two states are possible.

Figure 9:
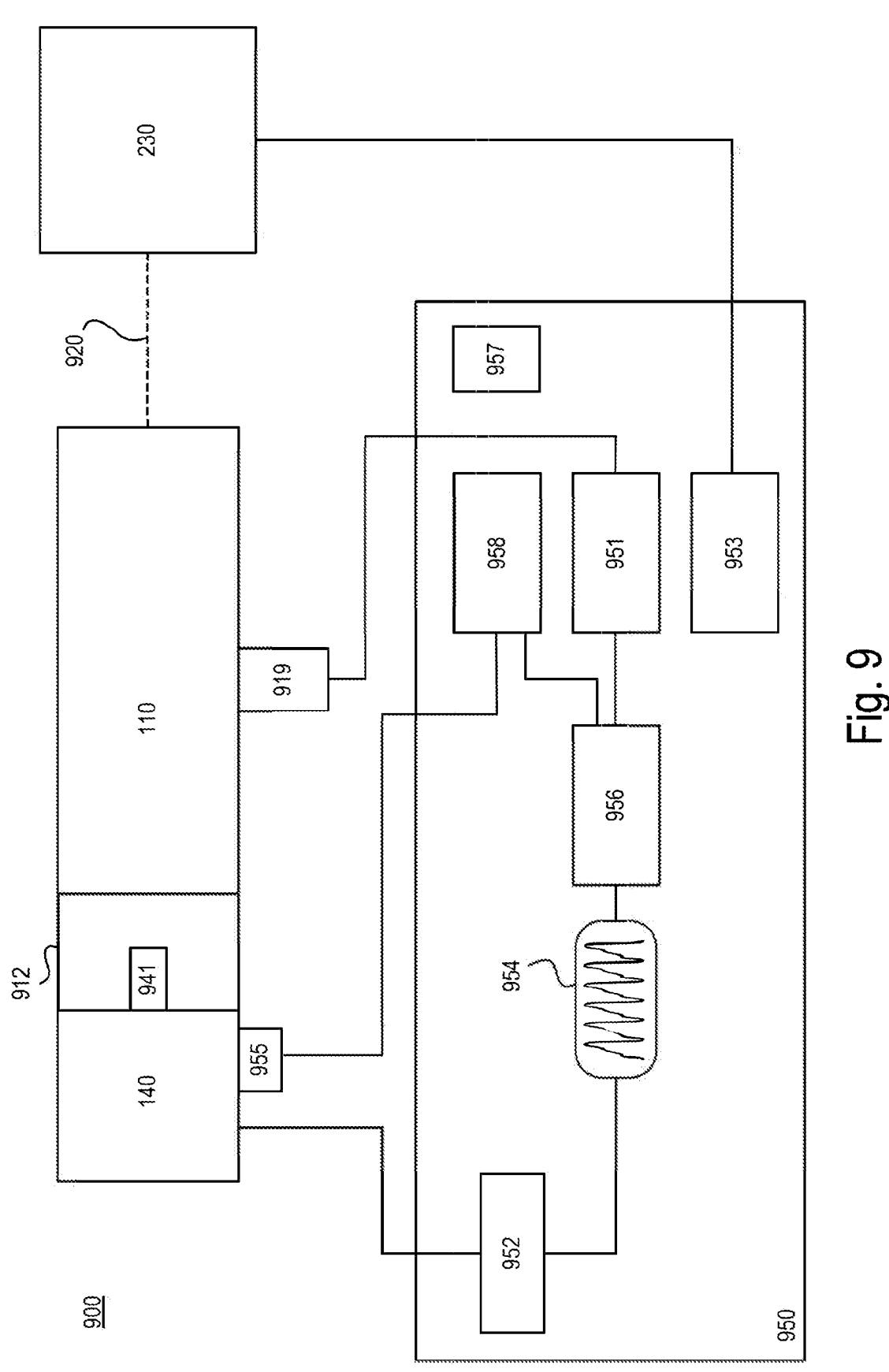
FIG. 9 is a block diagram of an implementation of the predictive control apparatus of FIG. 1.

Referring to FIG. 9, an implementation $900$ of the predictive control apparatus $100$ is shown. Similar to the predictive control apparatus $100$, the predictive control apparatus $900$ includes a controller $950$ in communication with the spectral feature actuator $140$, the controller $950$ including an actuator drive module $952$, a waveform module $956$, and a predictive module $958$ (which correspond to, respectively, the actuator drive module $152$, the waveform module $156$, and the predictive module $158$ of FIG. 1). The actuator drive module $952$ can, in implementations in which data is fed to the spectral feature actuator $140$ at a very high rate, include a field programmable gate array (FPGA). Furthermore, the controller $950$ is also in communication with the optical apparatus $110$ and the photolithography exposure apparatus $230$, and the predictive control apparatus $900$ includes additional components relating to this communication, as follows.

The predictive control apparatus $900$ includes an actuator sensor $955$ configured to sense one or more aspects of the spectral feature actuator $140$. The predictive module $958$ is in communication with the actuator sensor $955$ to thereby receive the sensed aspects of the spectral feature actuator $140$ from the actuator sensor $955$. In some implementations, the actuator sensor $955$ senses an actual position of the optical element $941$ within the spectral feature adjuster $912$ that is modified to change the spectral feature of a light beam $920$. For example, the actuator sensor $955$ can be configured to sense an actual position or state of the prism $641\text{-}3$ or $741\text{-}3$. In other implementations, the actuator sensor $955$ is configured to sense a state or position of the actuation system within the spectral feature actuator $140$ that is physically coupled to the prism. For example, the actuator sensor $955$ can be configured to sense a state or physical aspect of the actuation system $743\text{-}3$. The actuator sensor $955$ can be any sensing device that enables this determination, such as, for example, an optical rotary encoder that provides angular position feedback, a capacitive position sensor, a potentiometer, or a strain gauge.

The predictive control apparatus $900$ includes a measurement system $919$, which, like the measurement system $519$, includes one or more measurement devices each configured to measure or sense a spectral feature of a light beam within or output from the optical apparatus $110$. Thus, in the implementation in which the controller $950$ controls the wavelength of the light beam $120$ to transition between a plurality of discrete values, then controller $950$ receives information from a wavelength analysis module (such as module $521$) within the measurement system $919$, such wavelength analysis module configured to output a sensed value of the wavelength of the light beam $920$. To this end, the controller $950$ further includes a spectral feature module $951$ configured to receive the sensed wavelength from the measurement system $919$ and to analyze the sensed wavelength, as discussed below.

The controller $950$ also includes a lithography module $953$ in communication with the photolithography exposure apparatus $230$. For example, the lithography module $953$ can receive information and instructions from the lithography controller $234$. The controller $950$ also includes a light source module $957$, which can be configured to instruct the optical apparatus $110$ to produce pulses of the light beam $920$ based on information or an analysis from any one or more of the other modules within the controller $950$. For example, the light source module $957$ can send a trigger signal to one or more of the energy sources (such as electrodes) within the MO chamber and the PA chamber of the optical apparatus $510$ to cause the optical apparatus $510$ to produce the light beam $520$, such outgoing trigger signal being based on an incoming trigger signal received from the lithography module $953$.

Figure 10:
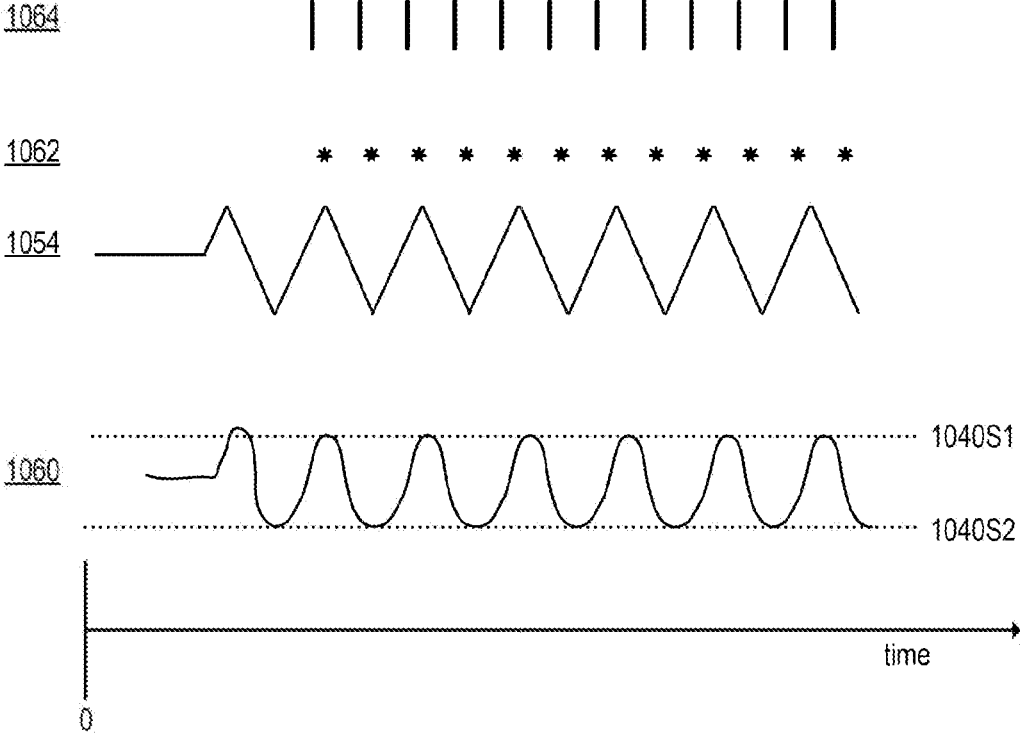
FIG. 10 is a diagram showing the relationship between a control waveform applied to the spectral feature actuator of FIG. 9, an incoming trigger signal received from the photolithography exposure apparatus, a train of pulses of the light beam produced by the optical apparatus in response to the incoming trigger signal, and an actual state of an actuation system of the spectral feature adjuster within the optical apparatus.

Referring to FIG. 10, the control waveform $154$ is a periodic driving signal $1054$ that governs the trajectory of the actuation system (such as the actuation system $743\text{-}3$ physically coupled to the prism $741\text{-}3$). FIG. 10 also shows an incoming trigger signal $1064$ received from the lithography controller $234$ of the photolithography exposure apparatus $230$ at the lithography module $953$. The trigger signal $1064$ includes a set of trigger pulses, each trigger pulse instructing the optical apparatus $110$ to produce a pulse of the light beam $920$. In various configurations of a scanner-source arrangement, the timing between trigger pulses indicates the pulse repetition rate that is requested by the scanner. FIG. 10 also shows a train $1062$ of pulses of the light beam $120$ produced by the optical apparatus $110$ (under control of the light source module $957$) in response to the incoming trigger signal $1064$. The actual state of the actuation system $743\text{-}3$ is shown by the waveform $1060$.

The control waveform $1054$ can be any waveform that ensures that the prism $741\text{-}3$ is at a desired position or state at the same time that a pulse of the light beam $515p$ (and $715p$) is produced from the seed light stage $511$.

The driving signal $1054$ shown in this example has a triangular and continuous form.

However, the driving signal $1054$ is not limited to this shape. The driving signal $1054$ is any shape that drives or modifies the actuation system in a continuous manner through various positions or states to cause the spectral feature actuator $140$ to exist at various moments in one of a plurality of targeted discrete states, for example, at first state $1040S1$ and at second state $1040S2$. The desired motion of the spectral feature actuator $140$ is to synchronize the placement of the spectral feature adjuster $912$ (for example, the prism $741\text{-}3$) at the desired position or state with the production of the pulses in the train $1062$ of the light beam $120$ from the optical apparatus $110$. In the example illustrated by FIG. 10, the spectral feature adjuster $912$ is alternated on a pulse-to-pulse basis between two states. This adjustment can be used, for example, to implement a pulse-to-pulse alternation between two wavelengths for the light beam $920$.

Figure 11A:
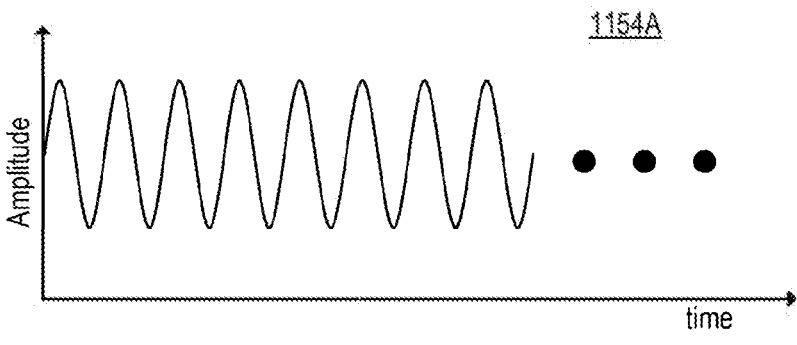
FIG. 11A is an example of a sinusoidal control waveform applied to the spectral feature actuator of FIG. 1.
Figure 11B:
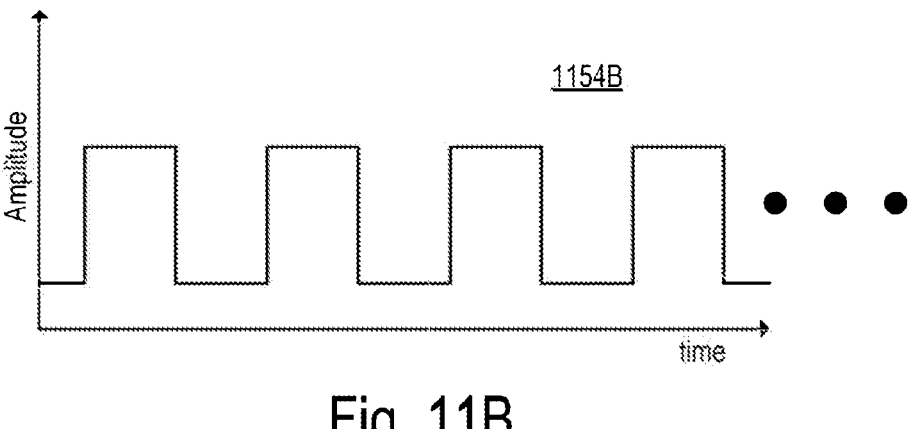
FIG. 11B is an example of a square control waveform applied to the spectral feature actuator of FIG. 1.
Figure 11C:
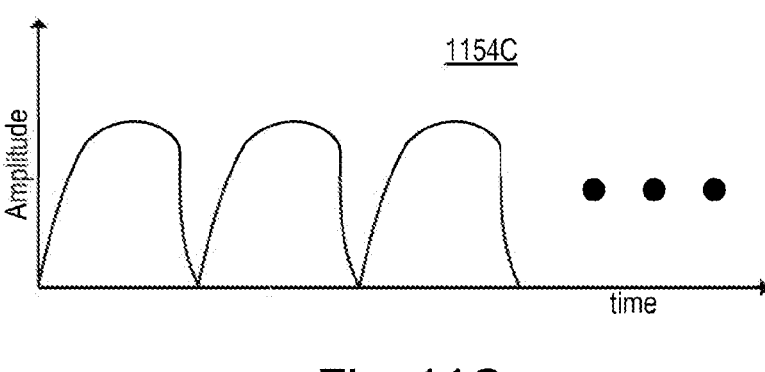
FIGS. 11C-11E are examples of modified, multi-shapes, or more complex control waveforms that can be applied to the spectral feature actuator of FIG. 1.
Figure 11D:
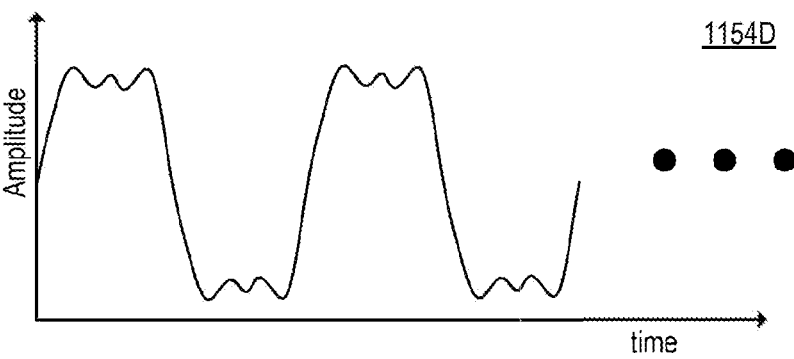
Figure 11E:
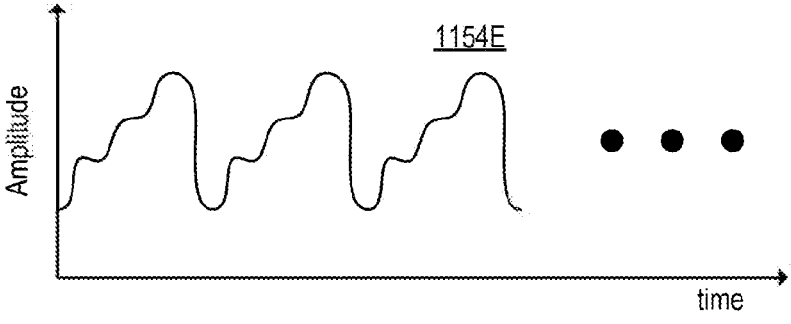

Other examples of the control waveform $154$ are shown in FIGS. 11A-11E. In FIG. 11A, the control waveform $1154A$ is a sinusoidal waveform. In FIG. 11B, the control waveform $1154B$ is a square waveform. Modified, multi-shapes, or more complex waveforms $1154C$, $1154D$, $1154E$ are shown, respectively, in FIGS. 11C-11E.

Figure 12:
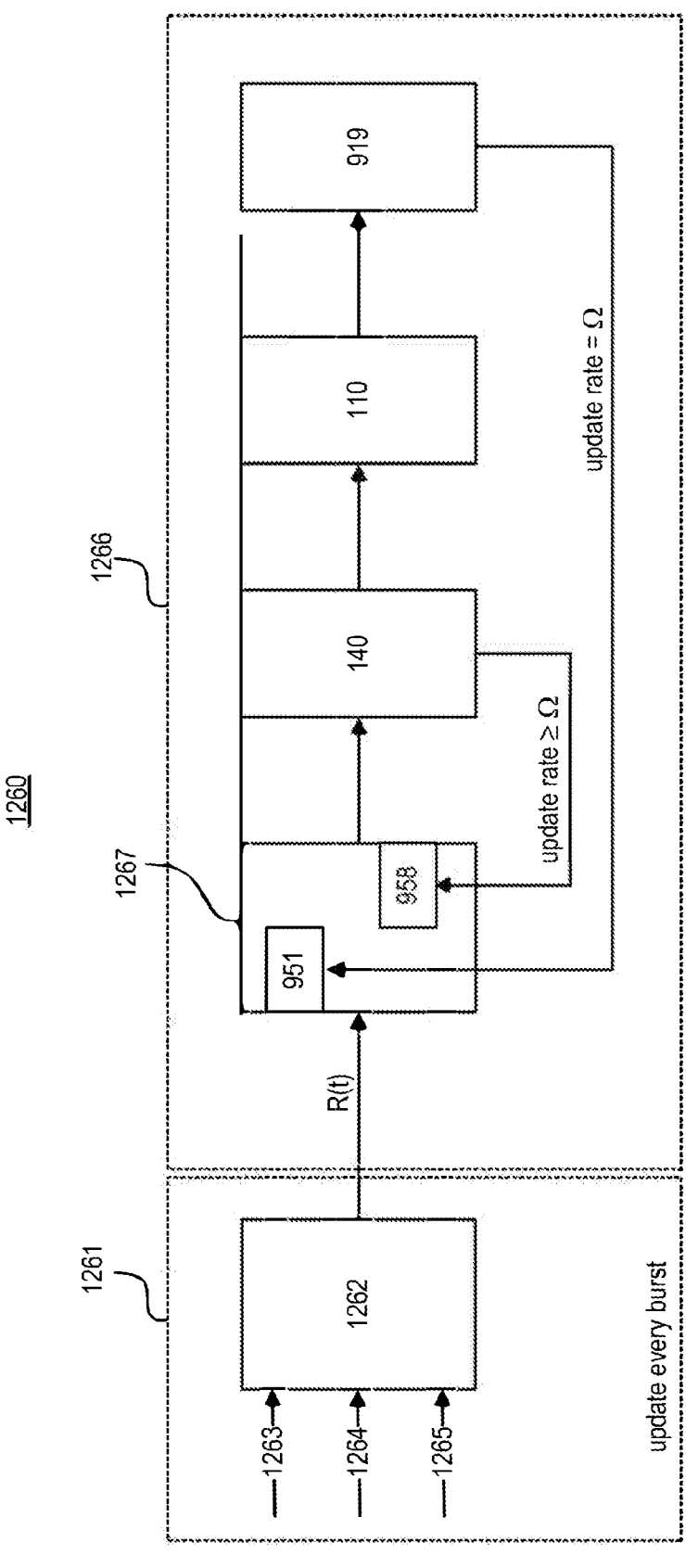
FIG. 12 is a block diagram of a control structure implemented by the predictive control apparatus of FIG. 1 or 9.

Referring to FIG. 12, a block diagram of a control structure $1260$ is shown. The control structure $1260$ is broken up into two sections based on how often the data is received and/or updated. The first and slower control section $1261$ includes the reference generator $1262$ within the waveform module $956$. The reference generator $1262$ receives data at a rate that is slower than a rate at which the pulses of the light beam $920$ are produced (and therefore slower than a repetition rate of the optical apparatus $110$). For example, the reference generator $1262$ can be configured to receive and operate on data once for each burst of pulses of the light beam 920. The reference generator 1262 receives the data, and based on this data, computes a reference trajectory R(t) or desired baseline trajectory that governs how the spectral feature actuator 140 is adjusted.

In the implementation shown in FIG. 12, the reference generator 1262 receives a set of data 1263, 1264, 1265. Data 1263 corresponds to a pulse repetition rate ("Ω") as determined from the trigger signal 1064 received from the photolithography exposure apparatus 230 (see FIGS. 9 and 10). The data (Ω) 1263 can be conveyed from the lithography module 953 to the waveform module 956 for analysis by the reference generator 1262. Data 1264 corresponds to a target spectral feature separation ("Δ"). For example, if the spectral feature is the wavelength, then this separation Δ is a difference between the two discrete desired wavelengths for the light beam 120/920. This target wavelength separation Δ can be determined based on information from the photolithography exposure apparatus 230. For example, the target wavelength separation Δ can be determined based on the process recipe received by the lithography module 953. Data 1265 corresponds to a sensitivity metric Π, which indicates how much the value of the spectral feature (such as the wavelength) of the light beam 920 changes in response to a change in the spectral feature actuator 140. The sensitivity metric Π can be a calibrated quantity that is determined prior to beginning operation of the optical apparatus 110. For example, the sensitivity metric Π can be determined using by scanning the spectral feature actuator 140 in a known manner and measuring the actual value of the spectral feature output from the measurement system 919 to determine how the spectral feature of the light beam 920 changes in response to the change in the spectral feature actuator 140.

In some implementations, the reference generator 1262 calculates the reference trajectory R(t) in accordance with the following equation:

$$R(t) = \frac{\Delta}{2 \times \prod} \times \cos\left(2\pi \times \frac{\Omega}{2} \times t\right).$$

In this equation, the value of Ω/2 corresponds to the frequency of the reference trajectory waveform and the value of Δ/(2×Π) corresponds to the amplitude (the magnitude or intensity) of the reference trajectory waveform.

If no adjustments are made by other parts of the control structure 1260, then the control waveform 954 is based directly on and corresponds to the reference trajectory R(t). That is, if there are no exogenous disturbances to the operation of the spectral feature actuator 140 and the control operates as modeled, then having the spectral feature actuator 140 transition according to the reference trajectory R(t) would be sufficient to generate the pulses of the light beam 920 at the desired discrete wavelengths.

However, the operation of the spectral feature actuator 140 as well as the operation of the optical apparatus 110 are not perfect, and a mis-match existing between the modeled reference trajectory R(t) and the actual movement of the spectral feature actuator 140 as well as disturbances to the spectral feature actuator 140 and the optical apparatus 110 introduce errors into a control structure that would be based solely on the output from the reference generator 1262.

Thus, to this end the control structure 1262 includes a faster control section 1266 that includes a feedback control 1267. The feedback control 1267 is implemented by two different overlapping controls, effected by the spectral feature module 951 and the predictive module 958.

The feedback control 1267 implemented by the spectral feature module 951 receives and analyzes the sensed wavelength of the light beam 920 from the measurement system 919. This data can be received at a rate that corresponds to the repetition rate Ω instructed by the photolithography exposure apparatus 230. Thus, the spectral feature module 951 can receive the sensed wavelength of the light beam 920 each time a pulse of the light beam 920 is produced. The feedback control 1267 can convert the measured or sensed value of the wavelength of the light beam 920 into an estimate of the position of the spectral feature actuator 140 using the sensitivity metric Π. As discussed above, the sensitivity metric Π indicates how much the value of the wavelength of the light beam 920 changes in response to a change in position of the spectral feature actuator 140. Thus, the spectral feature module 951 can divide the measured value of the wavelength by the sensitivity metric Π to obtain an estimate of a position of the spectral feature actuator 140.

The spectral feature module 951 compares the estimate of the position of the spectral feature actuator 140 to value of the reference trajectory R(t) at that point in time. The spectral feature module 951 determines whether the reference trajectory R(t) needs to be adjusted based on this analysis. The analysis and determination can proceed according to any suitable control process such as, for example, proportional-integral-derivative control, Model Predictive Control, and state feedback with Kalman filter.

The spectral feature module 951 can control or affect the change to the reference trajectory R(t) by sending an instruction to the waveform module 956 to adjust one or more of the amplitude, frequency, and phase of the reference trajectory R(t). For example, if a timing between actuations applied by the spectral feature actuator 140 and a pulsing event occurring in the optical apparatus 110 vary and this variance is not captured in the model used for calculating the control waveform R(t) in control structure 1262, then this variance could result in a bias in the actual wavelength separation Δactual, and such bias can be identified by the spectral feature module 951. Thus the spectral feature module 951 can attempt to adjust the control waveform R(t) to compensate for such bias, or error compared against target wavelength separation Δ. Depending on the type of control strategy being implemented, a proportional-integral-derivative (PID) control can attempt to modulate the amplitude of the control waveform R(t) to thereby reduce the error in the wavelength separation (that is, the difference between the actual wavelength separation Δactual and the target wavelength separation Δ). Another control strategy that can be implemented by the spectral feature module 951 can be a Kalman filter with state feedback, which can attempt to adjust one or more of the phase and the amplitude of the control waveform R(t).

The feedback control 1267 implemented by predictive module 958 receives the measured aspects (for example, the position) of the spectral feature actuator 140 from the actuator sensor 955. This data can be received at a rate that is greater than the pulse repetition rate Ω. Thus, the predictive module 958 can receive the measured position of the spectral feature actuator 140 many times during the transition of the spectral feature actuator 140 from a first state to a second state. For example, the measured position of the spectral feature actuator 140 can be received at a rate that is at least twice, at least five, or ten times the pulse repetition rate Ω.

The error or difference between the measured position of the spectral feature actuator 140 and the reference trajectory R(t) can be evaluated using any suitable control, such as, for example, any servo control technique, proportional-integral-derivative (PID) control, Model Predictive Control, or state feedback with Kalman filter, which can provide somewhat better performance in predictive tracking and disturbance rejection.

Adjustments to the control waveform 954 can be made based on the evaluation to ensure that the actual trajectory of the spectral feature actuator 140 controls the prism 741-3 in a manner that the next pulse of the light beam 920 is produced at the target wavelength.

Figure 13:
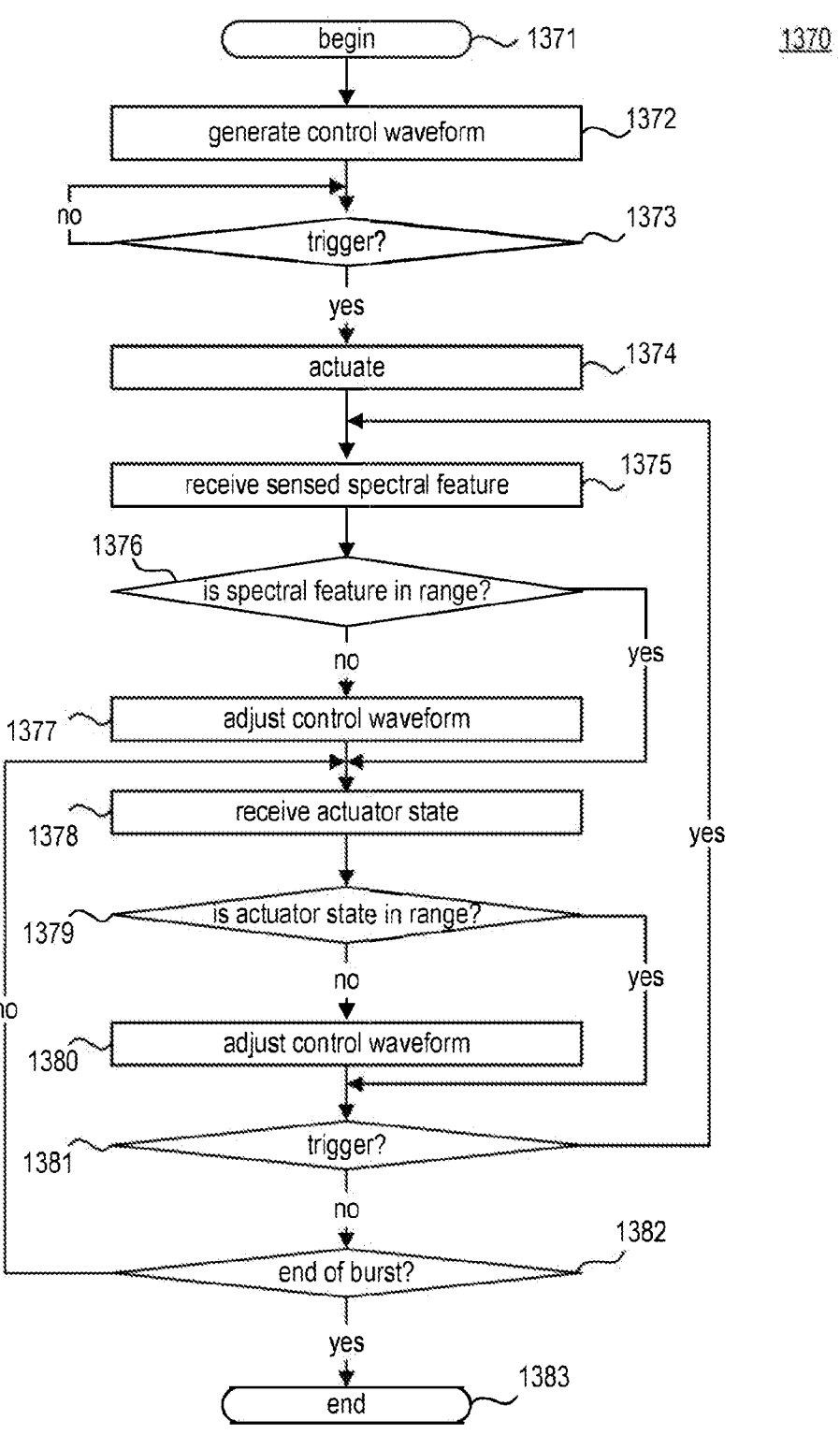
FIG. 13 is a flow chart of a procedure performed by the predictive control apparatus of FIG. 1 or 9.

Referring to FIG. 13, a procedure 1370 is performed by the controller 950. The procedure 1370 begins [1371] with the start of a burst of pulses. The waveform module 956 calculates the control waveform R(t) 954 [1372]. For example, the waveform module 956 receives the pulse repetition rate Ω, the target spectral feature separation Δ; and the sensitivity metric Π, and performs this is used to calculate the reference trajectory R(t) as a function of time.

A dynamic model of the spectral feature actuator 140 can be used to calculate the control waveform R(t) [1372] so as to minimize a difference between the actual wavelength of the light beam 920 and the target wavelength. For example, the control waveform R(t) can be computed using dynamic programming, which is well adapted for dealing with complex models that contain nonlinear dynamics. If the dynamic model of the spectral feature actuator 140 is adopted that has strong nonlinear dynamics, then dynamic programming can be used to generate the control signal R(t) for given wavelength targets. Dynamic programming does, however, present the challenge that it requires significant computational resources. To overcome this challenge, a data storage device such as a pre-populated look-up-table or a pre-programmed field programmable gate array (FPGA) can be used that contains optimal control parameters for at least some of the different repetition rates at which the optical apparatus 110 can be operated.

As another example, the control waveform R(t) can be calculated [1372] using model inversion feedforward control. This method relies on the dynamic model of the spectral feature actuator 140 to construct a digital filter that inverts the actuator dynamic. By passing the desired waveform for the desired actuator trajectory through this filter, a control waveform R(t) can be generated in real time to achieve zero steady state error tracking.

As another example, the control waveform R(t) can be calculated [1372] using a learning algorithm to guarantee error convergence over several iterations of learning.

The control waveform R(t) can potentially achieve two separate wavelengths separated by 1000 femtometers (fm) with a separation error that is below 20 fm.

As a further example, the control waveform R(t) can be calculated [1372] using a combination of feed-forward control and iterative learning control (ILC).

In some implementations, quadratic programming with constraints can be used in the calculation [1372] to help find an optimal feed-forward signal within a feasible region of operation.

If the controller 950 receives a trigger pulse (such as from the trigger signal 1064) [1373], then the controller 950 (by way of the actuator drive module 952) instructs the spectral feature actuator 140 to operate [1374] in accordance with the reference trajectory R(t). The controller 950 also instructs the optical apparatus 110 (by way of light source module 957) to begin producing pulses of the light beam 920.

The controller 950 (via the spectral feature module 951) receives the sensed wavelength of the next pulse of the light beam 920 from the wavelength analysis module of the measurement system 919 [1375] and the spectral feature module 951 analyzes the sensed wavelength, as discussed above, to determine whether the measured spectral feature is within an acceptable range [1376]. If the spectral feature module 951 determines that the measured spectral feature is outside the acceptable range [1376], then the waveform module 956 is instructed to adjust the control waveform 954 [1377]. For example, the waveform module 956 could adjust one or more of an amplitude, a frequency, and a phase of the reference trajectory R(t).

Next, the controller 950 (via the predictive module 958) receives the sensed one or more aspects of the spectral feature actuator 140 from the actuator sensor 955 [1378] and analyzes this information (as discussed above) to determine whether the spectral feature actuator 140 is in a desired state [1379]. If the predictive module 958 determines that the spectral feature actuator 140 is not in the desired state [1379], then it instructs the waveform module 956 to adjust the control waveform 954 [1380] by, for example, adjusting one or more of an amplitude, a frequency, and a phase of the reference trajectory R(t).

As long as the next trigger pulse has not yet been received [1381] and it is not the end of a burst [1382], then the procedure reverts back to step 1378, where the controller 950 (via the predictive module 958) receives the sensed one or more aspects of the spectral feature actuator 140 from the actuator sensor 955 [1378]. As discussed above, this loop (steps 1378-1382) can be performed several times between the production of two pulses of the light beam 920.

Other aspects of the invention are set out in the following numbered clauses.

1. A light beam control apparatus comprising:
a spectral feature actuator associated with a set of different states, each state configured to cause an optical apparatus to generate one or more pulses of a light beam at a discrete value of a spectral feature of the light beam; and
a controller in communication with the spectral feature actuator, the controller including:
an actuator drive module configured to cause the spectral feature actuator to transition among the set of different states according to a control waveform;
a waveform module configured to compute the control waveform for the spectral feature actuator that governs the transition among the set of discrete values; and
a predictive module configured to receive one or more sensed aspects of the spectral feature actuator and instruct the waveform module to adjust the control waveform based on the received sensed aspects.

2. The light beam control apparatus of clause 1, further comprising an actuator sensor configured to sense one or more aspects of the spectral feature actuator, wherein the predictive module is in communication with the actuator sensor to receive the sensed aspects of the spectral feature actuator.

3. The light beam control apparatus of clause 1, wherein the controller drives the spectral feature actuator among the set of different states at a frequency correlated with a pulse repetition rate requested by a lithography exposure apparatus receiving the light beam for patterning a substrate.

4. The light beam control apparatus of clause 1, wherein the controller drives the spectral feature actuator among the set of different states at a frequency that is greater than a pulse repetition rate, the pulse repetition rate corresponding to a rate at which the one or more pulses of the light beam are generated.

5. The light beam control apparatus of clause 1, wherein the controller includes a lithography module in communication with a lithography exposure apparatus and configured to receive a pulse repetition rate from the lithography exposure apparatus, wherein the control waveform is based on the pulse repetition rate received from the lithography exposure apparatus.

6. The light beam control apparatus of clause 1, wherein each time a pulse is generated, the spectral feature actuator is in one of the different states and the light beam pulse has a spectral feature that corresponds to that different state.

7. The light beam control apparatus of clause 1, further comprising a measurement apparatus configured to sense a spectral feature of the light beam, wherein the controller comprises a spectral feature module configured to receive the sensed spectral feature of the light beam, to analyze the sensed spectral feature, and to instruct the waveform module to adjust the control waveform based on the analysis.

8. The light beam control apparatus of clause 7, wherein the spectral feature module is configured to analyze the sensed spectral feature using one or more of: proportional-integral-derivative control, Model Predictive Control, and state feedback with Kalman filter.

9. The light beam control apparatus of clause 7, wherein the spectral feature module is configured to analyze the sensed spectral feature by converting the sensed spectral feature to an estimated state of the spectral feature actuator and then comparing this estimated state of the spectral feature actuator to the output of the control waveform.

10. The light beam control apparatus of clause 1, wherein the spectral feature actuator is in communication with at least one optical element of a spectral feature adjuster of the optical apparatus, the at least one optical element optically interacting with the light beam.

11. The light beam control apparatus of clause 10, wherein each different state of the spectral feature actuator corresponds to a discrete state of the optical element.

12. The light beam control apparatus of clause 11, wherein a discrete state of the optical element is a discrete location at which the optical element optically interacts with the light beam.

13. The light beam control apparatus of clause 10, wherein the optical element includes a prism through which the light beam passes.

14. The light beam control apparatus of clause 13, wherein the spectral feature actuator includes at least a motor physically coupled to the prism, the operation of the motor causing the prism to rotate.

15. The light beam control apparatus of clause 10, wherein the spectral feature adjuster comprises:

a dispersive optical element arranged to interact with the light beam; and a plurality of prisms arranged in the path of the light beam between the dispersive optical element and an output of the optical apparatus, wherein the optical element in communication with the spectral feature actuator is at least one of the prisms or the dispersive optical element.

16. The light beam control apparatus of clause 10, wherein the spectral feature adjuster optically interacts with a seed pulsed light beam generated by a first gas discharge stage of the optical apparatus.

17. The light beam control apparatus of clause 1, wherein the spectral feature of the light beam is a wavelength or a bandwidth of the light beam.

18. The light beam control apparatus of clause 1, wherein the control waveform includes a periodic driving signal.

19. The light beam control apparatus of clause 1, wherein the waveform module is configured to adjust the control waveform by adjusting one or more of a frequency and/or a phase of the control waveform.

20. The light beam control apparatus of clause 1, wherein the waveform module is configured to compute the control waveform based on:

a pulse repetition rate determined from triggers output from a lithography exposure apparatus receiving the light beam;

a target separation between the discrete values of the spectral feature of the light beam; and a sensitivity metric indicating how much the value of the spectral feature of the light beam changes in response to a change in the spectral feature actuator.

21. The light beam control apparatus of clause 1, wherein the predictive module is configured to analyze the received sensed aspects of the spectral feature actuator to determine the instructions to the waveform module to adjust the control waveform, wherein the analysis of the received sensed aspects of the spectral feature actuator includes one or more of proportional-integral-derivative control, model predictive control, and state feedback with a Kalman filter.

22. The light beam control apparatus of clause 21, wherein the waveform module adjusts the control waveform by modifying a trajectory of the control waveform in real-time.

23. The light beam control apparatus of clause 21, wherein the predictive module is configured to receive and analyze the sensed aspects of the spectral feature actuator at a rate that is at least twice, at least three times, or at least five times the frequency of the control waveform.

24. The light beam control apparatus of clause 1, wherein the control waveform causes the spectral feature actuator to cycle among the discrete values in accordance with a state frequency and the predictive module is configured to instruct the adjustment to the waveform module at an update frequency that is greater than the state frequency.

25. A method comprising:

producing pulses of a light beam;

while producing the pulses, driving a spectral feature actuator among a set of different states in accordance with a control waveform, with each different state corresponding to a discrete value of the spectral feature of the light beam such that, each time a pulse is generated, the spectral feature actuator is in one of the different states and the light beam pulse has a spectral feature that corresponds to that different state; and in between the production of pulses, adjusting the control waveform based on one or more sensed aspects of the spectral feature actuator.

26. The method of clause 25, further comprising sensing the one or more aspects of the spectral feature actuator.

27. The method of clause 25, further comprising receiving a pulse repetition rate from a lithography exposure apparatus that is positioned to receive the produced light beam pulses, wherein the control waveform includes a periodic structure correlated with the pulse repetition rate.

28. The method of clause 25, further comprising receiving a sensed spectral feature of the light beam and adjusting the control waveform based on the received sensed spectral feature.

29. The method of clause 25, wherein the spectral feature of the light beam is a wavelength or a bandwidth of the light beam.

30. The method of clause 25, wherein the control waveform includes a periodic driving signal.

31. The method of clause 25, wherein adjusting the control waveform based on one or more sensed aspects of the spectral feature actuator comprises adjusting one or more of a frequency, an amplitude, and a phase of the control waveform.

32. The method of clause 25, further comprising computing the control waveform based on one or more of:

a pulse repetition rate determined from triggers output from a lithography exposure apparatus receiving the light beam;

a target separation between the discrete values of the spectral feature of the light beam; and a sensitivity metric indicating how much the value of the spectral feature of the light beam changes in response to a change in the spectral feature actuator.

33. The method of clause 25, further comprising analyzing the one or more sensed aspects of the spectral feature actuator including performing one or more of proportional-integral-derivative control, model predictive control, and state feedback with a Kalman filter.

34. The method of clause 25, wherein adjusting the control waveform based on one or more sensed aspects of the spectral feature actuator comprises modifying a trajectory of the control waveform in real-time.

Other implementations are within the scope of the following claims.

What is claimed is:

1. A light beam control apparatus comprising:

a spectral feature actuator associated with a set of different states, each state configured to cause an optical apparatus to generate one or more pulses of a light beam at a discrete value of a spectral feature of the light beam; and a controller in communication with the spectral feature actuator, the controller including:

an actuator drive module configured to cause the spectral feature actuator to transition among the set of different states according to a control waveform;

a waveform module configured to compute the control waveform for the spectral feature actuator that governs the transition among the set of discrete values; and a predictive module configured to receive one or more sensed aspects of the spectral feature actuator and instruct the waveform module to adjust the control waveform based on the received sensed aspects.

2. The light beam control apparatus of claim 1, further comprising an actuator sensor configured to sense one or more aspects of the spectral feature actuator, wherein the predictive module is in communication with the actuator sensor to receive the sensed aspects of the spectral feature actuator.

3. The light beam control apparatus of claim 1, wherein the controller drives the spectral feature actuator among the set of different states at a frequency correlated with a pulse repetition rate requested by a lithography exposure apparatus receiving the light beam for patterning a substrate.

4. The light beam control apparatus of claim 1, wherein the controller drives the spectral feature actuator among the set of different states at a frequency that is greater than a pulse repetition rate, the pulse repetition rate corresponding to a rate at which the one or more pulses of the light beam are generated.

5. The light beam control apparatus of claim 1, wherein the controller includes a lithography module in communication with a lithography exposure apparatus and configured to receive a pulse repetition rate from the lithography exposure apparatus, wherein the control waveform is based on the pulse repetition rate received from the lithography exposure apparatus.

6. The light beam control apparatus of claim 1, wherein each time a pulse is generated, the spectral feature actuator is in one of the different states and the light beam pulse has a spectral feature that corresponds to that different state.

7. The light beam control apparatus of claim 1, further comprising a measurement apparatus configured to sense a spectral feature of the light beam, wherein the controller comprises a spectral feature module configured to receive the sensed spectral feature of the light beam, to analyze the sensed spectral feature, and to instruct the waveform module to adjust the control waveform based on the analysis.

8. The light beam control apparatus of claim 7, wherein the spectral feature module is configured to analyze the sensed spectral feature using one or more of: proportional-integral-derivative control, Model Predictive Control, and state feedback with Kalman filter.

9. The light beam control apparatus of claim 7, wherein the spectral feature module is configured to analyze the sensed spectral feature by converting the sensed spectral feature to an estimated state of the spectral feature actuator and then comparing this estimated state of the spectral feature actuator to the output of the control waveform.

10. The light beam control apparatus of claim 1, wherein the spectral feature actuator is in communication with at least one optical element of a spectral feature adjuster of the optical apparatus, the at least one optical element optically interacting with the light beam.

11. The light beam control apparatus of claim 10, wherein each different state of the spectral feature actuator corresponds to a discrete state of the optical element.

12. The light beam control apparatus of claim 11, wherein a discrete state of the optical element is a discrete location at which the optical element optically interacts with the light beam.

13. The light beam control apparatus of claim 10, wherein the optical element includes a prism through which the light beam passes.

14. The light beam control apparatus of claim 13, wherein the spectral feature actuator includes at least a motor physically coupled to the prism, the operation of the motor causing the prism to rotate.

15. The light beam control apparatus of claim 10, wherein the spectral feature adjuster comprises:

a dispersive optical element arranged to interact with the light beam; and a plurality of prisms arranged in the path of the light beam between the dispersive optical element and an output of the optical apparatus, wherein the optical element in communication with the spectral feature actuator is at least one of the prisms or the dispersive optical element.

16. The light beam control apparatus of claim 10, wherein the spectral feature adjuster optically interacts with a seed pulsed light beam generated by a first gas discharge stage of the optical apparatus.

17. The light beam control apparatus of claim 1, wherein the spectral feature of the light beam is a wavelength or a bandwidth of the light beam.

18. The light beam control apparatus of claim 1, wherein the control waveform includes a periodic driving signal.

19. The light beam control apparatus of claim 1, wherein the waveform module is configured to adjust the control waveform by adjusting one or more of a frequency and/or a phase of the control waveform.

20. The light beam control apparatus of claim 1, wherein the waveform module is configured to compute the control waveform based on:

a pulse repetition rate determined from triggers output from a lithography exposure apparatus receiving the light beam;

a target separation between the discrete values of the spectral feature of the light beam; and a sensitivity metric indicating how much the value of the spectral feature of the light beam changes in response to a change in the spectral feature actuator.

21. The light beam control apparatus of claim 1, wherein the predictive module is configured to analyze the received sensed aspects of the spectral feature actuator to determine the instructions to the waveform module to adjust the control waveform, wherein the analysis of the received sensed aspects of the spectral feature actuator includes one or more of proportional-integral-derivative control, model predictive control, and state feedback with a Kalman filter.

22. The light beam control apparatus of claim 21, wherein the waveform module adjusts the control waveform by modifying a trajectory of the control waveform in real-time.

23. The light beam control apparatus of claim 21, wherein the predictive module is configured to receive and analyze the sensed aspects of the spectral feature actuator at a rate that is at least twice, at least three times, or at least five times the frequency of the control waveform.

24. The light beam control apparatus of claim 1, wherein the control waveform causes the spectral feature actuator to cycle among the discrete values in accordance with a state frequency and the predictive module is configured to instruct the adjustment to the waveform module at an update frequency that is greater than the state frequency.

25. A method comprising:

producing pulses of a light beam;

while producing the pulses, driving a spectral feature actuator among a set of different states in accordance with a control waveform, with each different state corresponding to a discrete value of the spectral feature of the light beam such that, each time a pulse is generated, the spectral feature actuator is in one of the different states and the light beam pulse has a spectral feature that corresponds to that different state;

sensing one or more aspects of the spectral feature actuator; and in between the production of pulses, adjusting the control waveform based on one or more sensed aspects of the spectral feature actuator.

26. The method of claim 25, further comprising receiving a pulse repetition rate from a lithography exposure apparatus that is positioned to receive the produced light beam pulses, wherein the control waveform includes a periodic structure correlated with the pulse repetition rate.

27. The method of claim 25, further comprising receiving a sensed spectral feature of the light beam and adjusting the control waveform based on the received sensed spectral feature.

28. The method of claim 25, wherein the spectral feature of the light beam is a wavelength or a bandwidth of the light beam.

29. The method of claim 25, wherein the control waveform includes a periodic driving signal.

30. The method of claim 25, wherein adjusting the control waveform based on one or more sensed aspects of the spectral feature actuator comprises adjusting one or more of a frequency, an amplitude, and a phase of the control waveform.

31. The method of claim 25, further comprising computing the control waveform based on one or more of:

a pulse repetition rate determined from triggers output from a lithography exposure apparatus receiving the light beam;

a target separation between the discrete values of the spectral feature of the light beam; and a sensitivity metric indicating how much the value of the spectral feature of the light beam changes in response to a change in the spectral feature actuator.

32. The method of claim 25, further comprising analyzing the one or more sensed aspects of the spectral feature actuator including performing one or more of proportional-integral-derivative control, model predictive control, and state feedback with a Kalman filter.

33. The method of claim 25, wherein adjusting the control waveform based on one or more sensed aspects of the spectral feature actuator comprises modifying a trajectory of the control waveform in real-time.

* * * * *